(12) United States Patent
Nicholson

(10) Patent No.: US 8,792,157 B2
(45) Date of Patent: Jul. 29, 2014

(54) SYSTEMS AND METHODS FOR CASCADED RAMAN LASING AT HIGH POWER LEVELS

(75) Inventor: Jeffrey W. Nicholson, Warren, NJ (US)

(73) Assignee: OFS Fitel, LLC, Norcross, GA (US)

( * ) Notice: Subject to any disclaimer, the term of this patent is extended or adjusted under 35 U.S.C. 154(b) by 561 days.

(21) Appl. No.: 12/777,963

(22) Filed: May 11, 2010

(65) Prior Publication Data

US 2010/0284060 A1 Nov. 11, 2010

Related U.S. Application Data

(60) Provisional application No. 61/177,058, filed on May 11, 2009.

(51) Int. Cl.
*H01S 3/30* (2006.01)
*H04B 10/17* (2006.01)
(52) U.S. Cl.
USPC .......................... 359/334; 359/337; 359/341.1
(58) Field of Classification Search
USPC .................................................. 359/337, 344
See application file for complete search history.

(56) References Cited

U.S. PATENT DOCUMENTS

| 4,947,134 | A | * | 8/1990 | Olsson | 359/344 |
| 5,887,093 | A | | 3/1999 | Hansen et al. | |
| 6,005,877 | A | * | 12/1999 | Gaeta et al. | 372/6 |
| 6,236,498 | B1 | * | 5/2001 | Freeman et al. | 359/337.1 |
| 6,310,899 | B1 | | 10/2001 | Jacobovitz-Veselka et al. | |
| 6,388,806 | B1 | * | 5/2002 | Freeman et al. | 359/341.3 |
| 6,525,872 | B1 | | 2/2003 | Ziari et al. | |
| 6,885,683 | B1 | * | 4/2005 | Fermann et al. | 372/25 |
| 7,298,546 | B2 | * | 11/2007 | Tokuhisa et al. | 359/333 |
| 7,420,994 | B2 | | 9/2008 | Korolev | |
| 7,936,795 | B2 | * | 5/2011 | Emori | 372/3 |
| 2005/0041702 | A1 | * | 2/2005 | Fermann et al. | 372/25 |
| 2007/0071059 | A1 | | 3/2007 | Afzal et al. | |
| 2008/0089366 | A1 | * | 4/2008 | Liu | 372/6 |
| 2008/0180787 | A1 | * | 7/2008 | DiGiovanni et al. | 359/334 |

FOREIGN PATENT DOCUMENTS

CN 101217227 A 7/2008

OTHER PUBLICATIONS

Babin et al., "Characteristics of a Two-Cascaded Raman Fiber Laser," Chinese Journal of Lasers, vol. 34, No. 2, pp. 156-172 (Feb. 2007).

* cited by examiner

*Primary Examiner* — Eric Bolda
(74) *Attorney, Agent, or Firm* — Jacobs & Kim LLP

(57) ABSTRACT

In a light amplification system, a fiber-based oscillator, amplifier, and cascaded Raman resonator are coupled together in series. The oscillator output is provided as an input into the amplifier, the amplifier output is provided as a pumping input into the cascaded Raman resonator, and the cascaded Raman resonator provides as an output single-mode radiation at a target wavelength. A loss element is connected between the oscillator and amplifier, whereby the oscillator is optically isolated from the amplifier and cascaded Raman resonator. A filter is coupled between the isolator and the amplifier for filtering out backward-propagating Stokes wavelengths generated in the cascaded Raman resonator. The oscillator is operable within a first power level range, and the amplifier and cascaded Raman resonator are operable within a second power level range exceeding the first power level range.

21 Claims, 7 Drawing Sheets

_US 8,792,157 B2_

SYSTEMS AND METHODS FOR CASCADED RAMAN LASING AT HIGH POWER LEVELS

CROSS REFERENCE TO RELATED APPLICATION

The present application claims the priority benefit of U.S. Provisional Patent Application Ser. No. 61/177,058, filed on May 11, 2009, which is owned by the assignee of the present application, and which is incorporated herein by reference in its entirety.

BACKGROUND OF THE INVENTION

1. Field of the Invention

The present invention relates generally to optical fiber devices and methods, and in particular to improved systems and methods for cascaded Raman lasing at high power levels.

2. Background Art

Fiber lasers and amplifiers are typically based on optical fibers that are doped with laser-active rare earth ions, such as ytterbium (Yb), erbium (Er), neodymium (Nd), and the like. Stimulated Raman scattering in optical fibers is a useful effect that can be employed in order to provide nonlinear gain at wavelength regions in which these fibers do not operate. Stimulated Raman scattering occurs when a laser beam propagates through a Raman-active fiber, resulting in a predictable increase in wavelength, known as the "Stokes shift." By providing a series of wavelength-specific reflector gratings at the input and output ends of a length of a Raman-active fiber, it is possible to create a cascaded series of Stokes shifts in order to convert a starting wavelength to a selected target wavelength.

FIG. 1 is a diagram of one exemplary system 20 according to the prior art, in which stimulated Raman scattering is used to generate a high-power output for pumping an erbium-doped fiber amplifier (EDFA). As illustrated, the system 20 comprises two stages: a monolithic Yb-fiber laser 40 and a cascaded Raman resonator (CRR) 60.

In laser 40, the active medium is provided by a length of a double-clad Yb-doped fiber 42 operating in the region of 1000 nm to 1200 nm. A high reflector grating 44 is provided at the input end of fiber 42, and an output coupler grating 46 is provided at the output end of fiber 42. In the present example, gratings 44 and 46 are written into separate segments of passive fiber that are fused to fiber 42. It would also be possible to write gratings 44 and 46 directly into the input and output ends of fiber 42.

High reflector 44, output coupler 46, and the fiber 42, together function as a laser cavity 48. Pumping energy is provided to fiber 42 by a plurality of pump diodes 50, which are coupled to fiber 42 by means of a tapered fiber bundle (TFB) 52. In the present example, laser 40 provides as an output single-mode radiation at a wavelength of 1117 nm.

The laser output is launched as an input into CRR 60. CRR 60 comprises a Raman-active fiber 62, including a first plurality of high reflector gratings 64 provided at its input end, and a second plurality of high reflector gratings 66 provided at its output end. Also provided at the output end of the Raman fiber 62 is an output coupler grating 68. In the present example, input gratings 64 and output gratings 66 are written into separate segments of passive fiber that are fused to fiber 62. It would also be possible to write gratings 64 and 66 directly into the input and output ends of fiber 62.

Input high reflectors 64, output high reflectors 66, output coupler 68, and Raman fiber 62 provide a nested series of Raman cavities 70, which create a cascaded series of Stokes shifts over a broad range, increasing the 1117 nm input wavelength to a 1480 nm target wavelength in a series of steps. Output coupler 68 provides a system output 72 at a target wavelength of 1480 nm, which can then be used to pump a high-power erbium-doped fiber amplifier (EDFA) in the fundamental mode.

System 20 may be used for other applications requiring output wavelength other than 1480 nm and may be configured to generate output wavelength in only a single step.

While FIG. 1 shows cascaded Raman resonator constructed using gratings 64, 66 and 68, similar resonators are well known using other wavelength selective elements such as fused-fiber couplers and thin-film filters and other architectures such as WDM loop mirrors. In addition, linear, unidirectional ring or bidirectional ring cavity geometries can be considered. Furthermore, FIG. 1 shows the cascaded Raman resonator configured to operate as a laser, but it equally well could be configured to operate as an amplifier by leaving off the final set of gratings and instead injecting a signal at that wavelength. Similar to the configuration shown in FIG. 1, these additional configurations will increase the 1117 nm input wavelength to a 1480 nm target wavelength in a series of steps.

The prior art system 20 suffers from known limitations. For example, one issue arises due to the fact that multiple reflectors at various wavelengths and positions in the system 20 combine to create coupled cavities. For example, it will be seen that there are three reflectors at the laser wavelength of 1117 nm, i.e., reflectors 44 and 46, and the leftmost member of output reflector group 66. In general this does not pose a problem for relatively low power systems (e.g., 5 W output at 1480 nm), but does pose a problem for high power systems. Recently, investigations have been undertaken with respect to power scaling of Raman fiber lasers, and power levels as high as 41 W have been demonstrated from a CRR. A similar situation arises in cascaded Raman resonators constructed using other well-known architectures, such as with WDM loop mirrors.

While high power has been demonstrated from such a system, the coupled cavity nature of the setup in FIG. 1 has serious implications on long-term reliable operation. In particular, the coupled cavity can cause the system to become unstable and generate pulses with sufficiently high peak-power to damage components. The laser high reflector 44 in particular has been found to be a weak link in the system, presumably due to the high power that propagates through it, and has been observed to fail under various conditions including, for example, using the system 20 to pump an erbium-doped fiber amplifier, or like device. In addition, it is possible for light from intermediate Stokes orders generated in the Raman laser to propagate back into the Yb amplifier and back to the pump diodes, causing them to fail. Furthermore, light at the first Stokes shift is within the gain bandwidth of Yb and is amplified before hitting the diodes. It will be apparent that this is also detrimental.

SUMMARY OF THE INVENTION

These and other issues of the prior art are addressed by the present invention, one aspect of which is directed to a light amplification system, in which a fiber-based oscillator, amplifier, and cascaded Raman resonator (CRR) are coupled together in series. The oscillator output is provided as an input into the amplifier, the amplifier output is provided as a pumping input into the CRR, and the CRR provides as an output single-mode radiation at a target wavelength. A wavelength-dependent loss element is connected between the oscillator and the amplifier in order to prevent backward propagation of light into the oscillator. The oscillator is operable within a first power level range, and the amplifier and oscillator are operable within a second power level range exceeding the first power level range.

DETAILED DESCRIPTION

Aspects of the present invention are directed to an optical amplifier system that provides a solution to the above-described shortcomings of the prior art.

Figure 1:
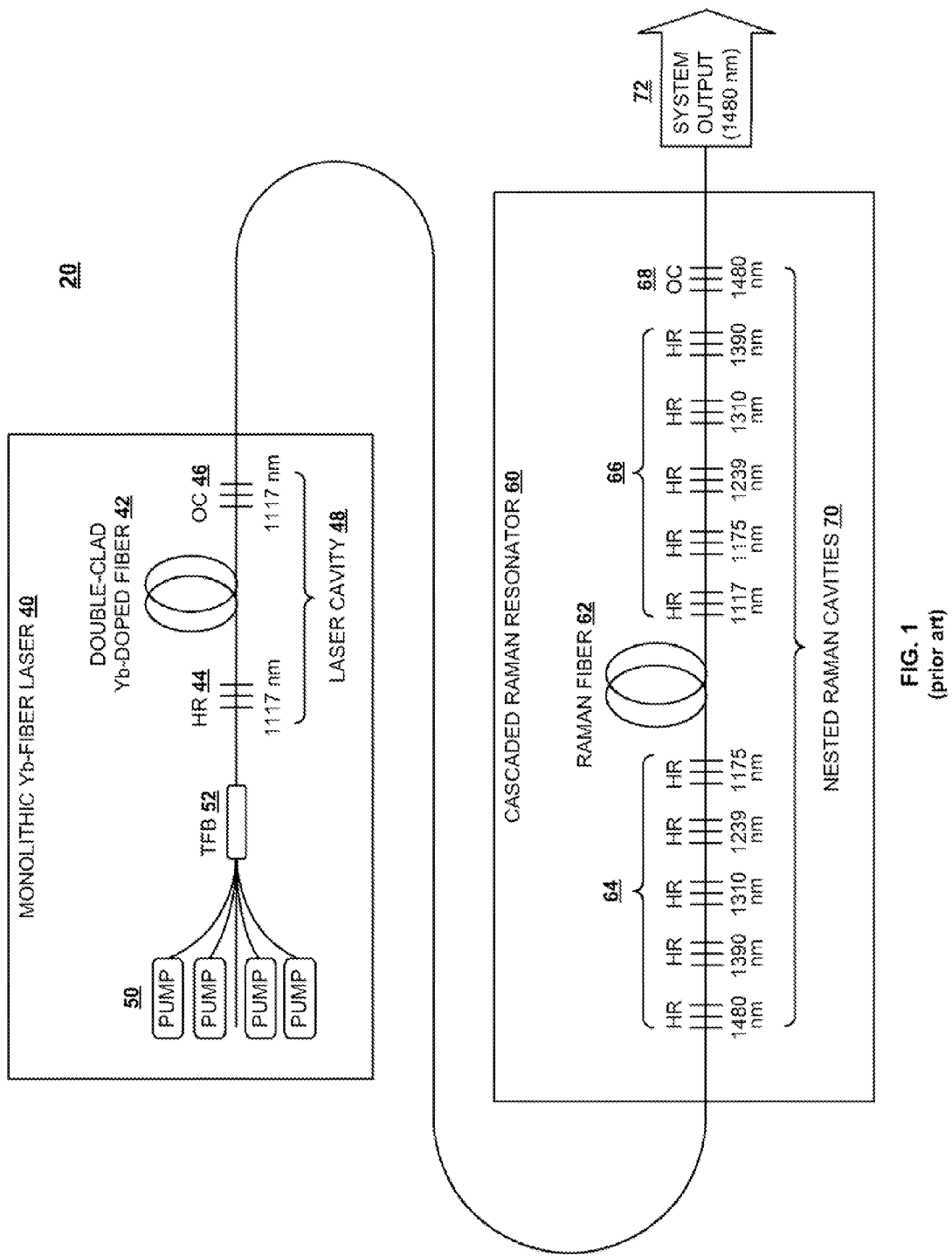
FIG. 1 is a diagram of a system according to the prior art in which a Yb-doped fiber laser is used to pump a cascaded Raman resonator.

Returning to the FIG. 1 system 20, it may appear that one possible solution would be to place an optical isolator between the Yb fiber laser 40 and the CRR 60. In the FIG. 1 architecture, the high powers being investigated pose significant challenges, as 41 W of output power at 1480 nm from the CRR 60 requires greater than 100 W of input power at 1117 nm, which is far higher than current fiber coupled isolators are capable of withstanding.

An aspect of the invention provides a solution for developing a high-power Raman laser with high reliability, in which the Yb-fiber laser, and in particular the laser's high reflector, are isolated from the Raman laser. According to this aspect of the invention, isolation is accomplished by breaking up the monolithic, high-power Yb-fiber laser into a master oscillator power amplifier (MOPA) configuration.

A MOPA configuration has been used in other contexts to generate high-power laser sources with well-controlled optical properties. A MOPA configuration has not been used in the context of pumping a cascaded Raman resonator (CRR), despite the fact that CRRs pumped by Yb-doped lasers have been commercially available for a number of years. The use of a MOPA configuration to pump a cascaded Raman resonator (CRR) is advantageous because it allows a significant increase in the power scaling of the system without sacrificing reliability.

Traditionally, a MOPA configuration is used to achieve optical characteristics which are not obtainable in an oscillator alone. For example, one uses an oscillator/amplifier configuration to generate high-power, narrow-linewidth radiation because of the difficulties in constructing a high-power, narrow-linewidth laser. In a Raman application, the MOPA does not generate output radiation with optical characteristics superior to those of a single laser. A Yb-doped fiber laser with moderate linewidth at 200 W or 300 W output power does not present significant challenges. The described MOPA configuration protects optical components when additional optical elements operating at wavelengths different from that of the Yb-laser are connected to the system. As described below, this protection is made possible through the use of wavelength-dependent optical elements placed between the oscillator and amplifier.

Figure 2:
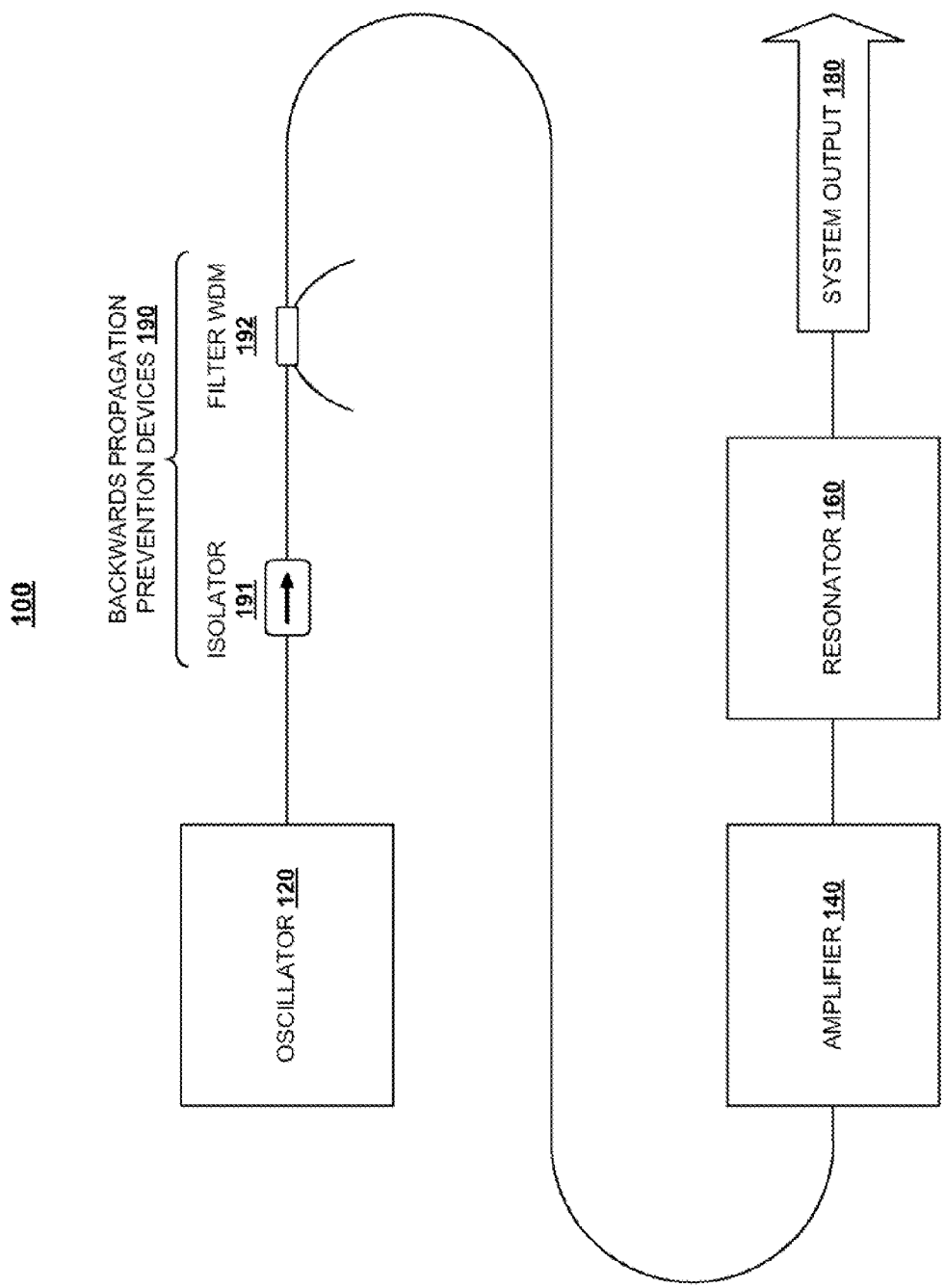
FIG. 2 is a block diagram of a system according to an aspect of the present invention, in which a master oscillator power amplifier configuration is used to pump a cascaded Raman resonator.

FIG. 2 is a block diagram of a system 100 illustrating this approach. As shown in FIG. 2, the system 100 comprises three stages: an oscillator 120, an amplifier 140 and a cascaded Raman resonator (CRR) 160 that produce a high-power output 180 having a selected wavelength and brightness level.

The laser high reflector is located in the oscillator stage 120, which operates at relatively low power, and which is separated from the high-power amplifier 140 and CRR 160 by means of one or more suitable coupling devices that prevent potentially damaging high-power light from propagating backward to the oscillator 120. For the purposes of the present description, a device of this type is generically referred to as a "wavelength-dependent loss element." Such wavelength-dependent loss elements include, for example, a fused-fiber or filter based wavelength division multiplexer (WDM), a long-period grating, an appropriately doped optical fiber, a filter fiber, or a tilted Bragg grating, for example. Other wavelength-dependent loss elements that pass radiation from the oscillator, while rejecting backwards-propagating, wavelength-shifted radiation from the amplifier or CRR, could also be used.

Due to the nature of the Raman scattering, light at many different wavelengths from the multiple Stokes shifts in the CRR can be propagating backwards towards the oscillator. These wavelengths are different from the wavelength at which the laser oscillator operates. Therefore, one or more wavelength-dependent loss elements may be used to remove light at these wavelengths. In addition, there may be backwards-propagating light at the same wavelength as the laser oscillator wavelength. Such light cannot be removed by a simple wavelength-dependent loss element. Thus, an optical isolator is used, which allows light at a given wavelength that is propagating in the forward direction to pass, while rejecting light at that same wavelength that is propagating in the backwards direction. Therefore, in addition to wavelength-dependent loss elements, an optical isolator may also be used between the oscillator and amplifier.

System 100 includes a wavelength-dependent loss element in the form of a WDM 192, connected between oscillator 120 and the amplifier 140. In addition, an optical isolator 191 is connected between the oscillator 120 and the amplifier 140. Optical isolator 191 allows light to propagate in only one direction therethrough, i.e., from the oscillator 120 into the amplifier 140. WDM 192 is configured to filter out backward-propagating Stokes wavelengths generated in the resonator 160 to prevent light at these wavelengths from reaching the oscillator 120. WDM 192 could be based, for example, on fused-fiber or thin-film couplers, on grating-type devices, or other devices that provide the function of wavelength-dependent filter. Although system 100 shows the use of a wavelength-dependent loss elements 192 and an optical isolator 191 connected between the oscillator 120 and the amplifier 140, it is possible to practice aspects of the invention using only one of these components, or the like, either singly, or in combination with one or more other components.

Thus, the described configuration allows the oscillator 120 to be operated at a relatively low power level, while the amplifier 140 and CRR 160 can be operated at a relatively high power level, with the components of oscillator 120 protected from exposure to potentially damaging high-power light.

Figure 3:
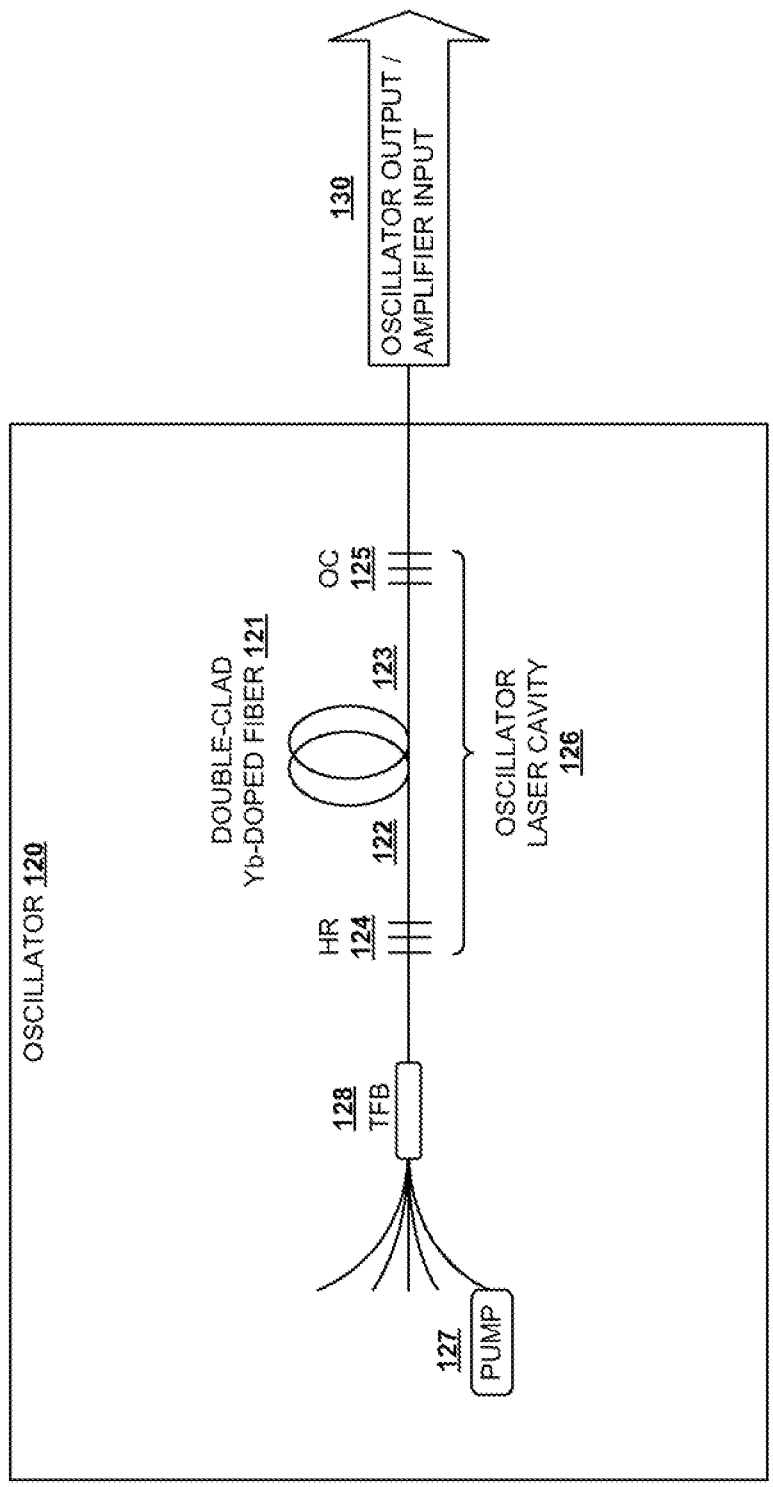
FIG. 3 is a diagram illustrating an exemplary oscillator stage in the FIG. 2 system.
Figure 4:
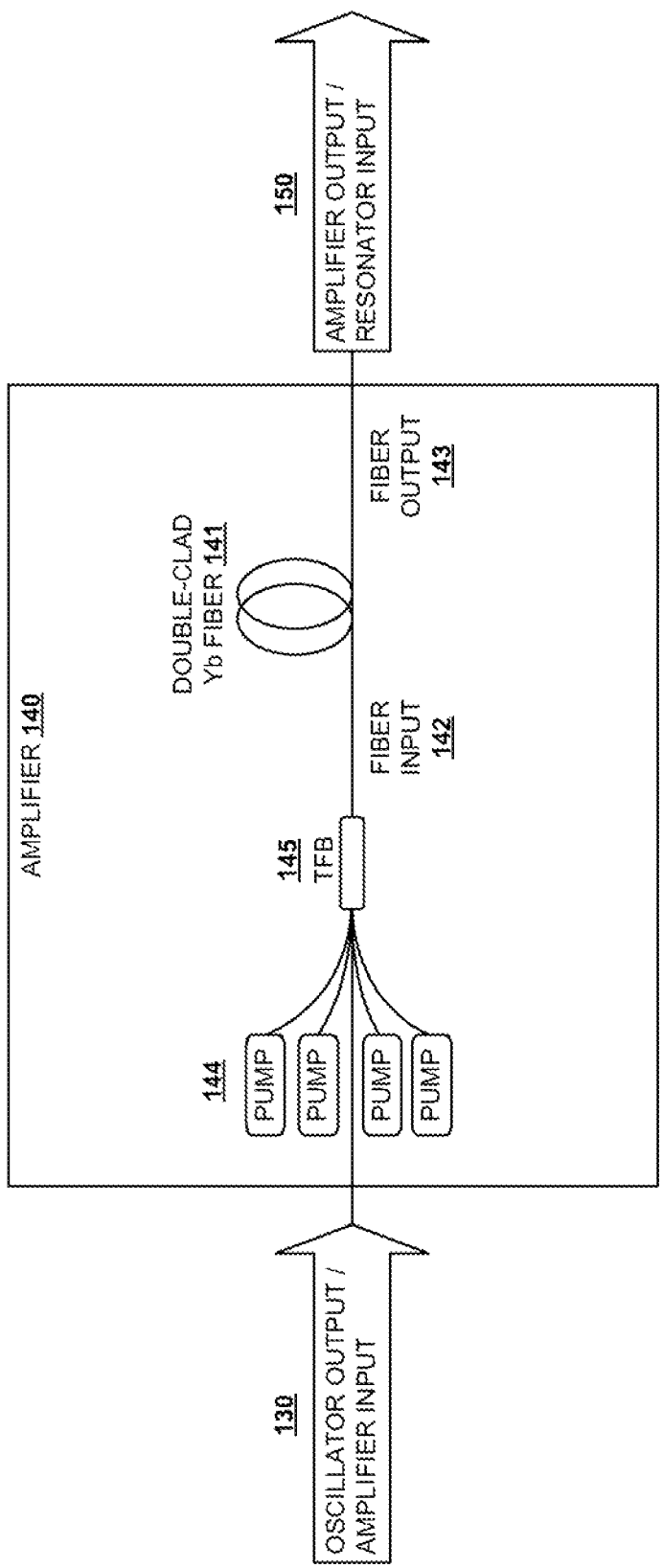
FIG. 4 is a diagram illustrating an exemplary amplifier stage in the FIG. 2 system.
Figure 5:
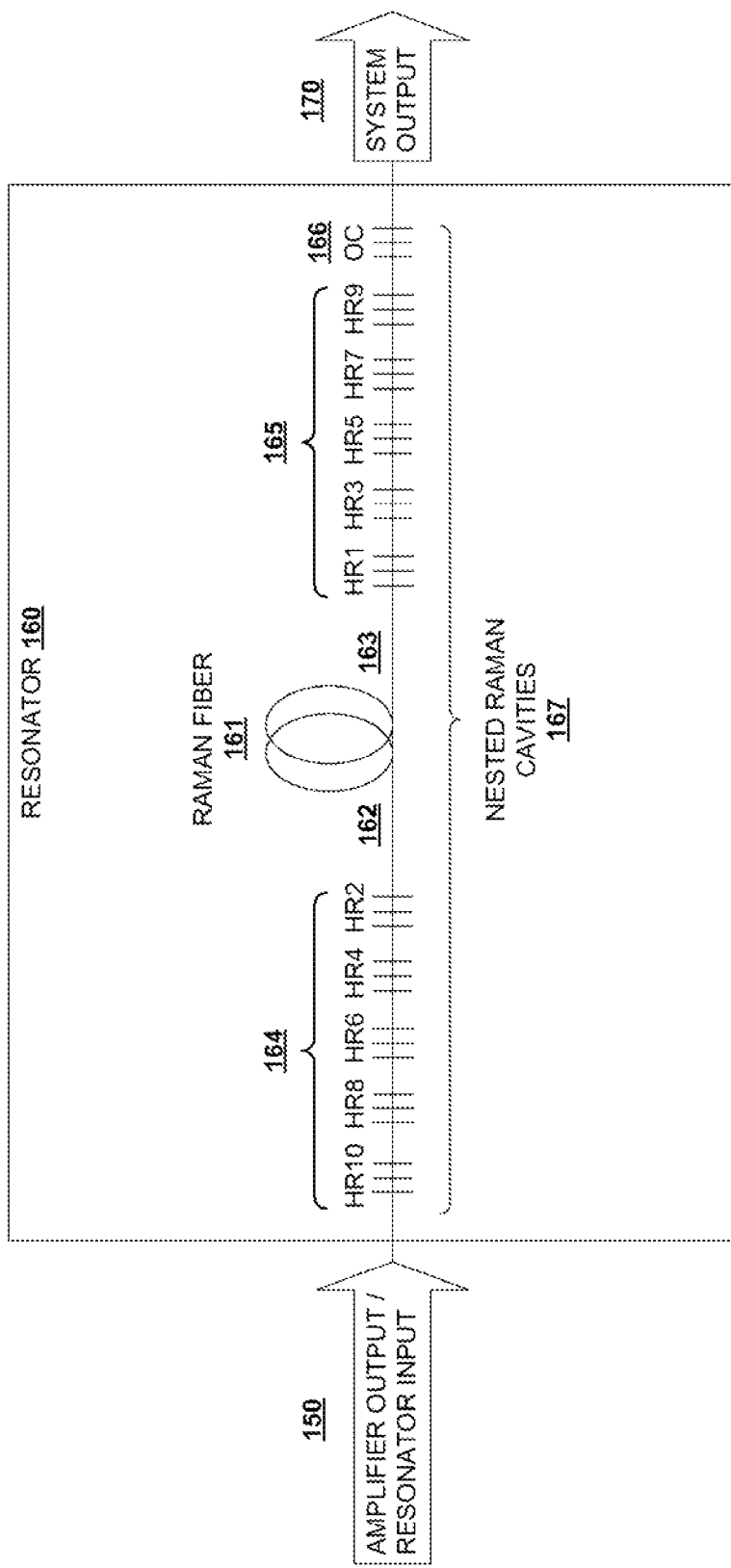
FIG. 5 is a diagram illustrating an exemplary cascaded Raman resonator stage in the FIG. 2 system.

Oscillator 120, amplifier 140, and CRR 160 are illustrated in greater detail in FIGS. 3-5.

As shown in FIG. 3, oscillator 120 comprises a first segment of a suitable laser-active fiber 121 having an input end 122 and an output end 123. In the present example, the optical fiber 121 used is a double-clad Yb-doped fiber. It will be apparent from the present description that other suitable fibers may also be used. For example, the power level is low enough that it may not be necessary to use a double-clad fiber.

A high reflector (HR) 124 is provided at the fiber input end 122, and an output coupler (OC) 125 is provided at the fiber output end 123. High reflector 124, output coupler 125, and fiber 121 function as a laser cavity 126. In the present example, high reflector 124 and output coupler 125 are written into separate segments of passive fiber that are fused to fiber 121. It would also be possible to write gratings 124 and 125 directly into the input and output ends of fiber 121.

As further shown in FIG. 3, a pump source 127, such as a diode laser or other suitable device, provides a pumping energy input into fiber segment 121. Pump 127 is coupled to fiber 121 by means of a tapered fiber bundle (TFB) 128 or other suitable device. Because the oscillator 120 is relatively low power, FIG. 3 shows one pump 127 coupled to fiber 121. The number of pumping devices 127 may be increased to achieve a particular amount of pumping energy. Also, as mentioned above, it may not be necessary for fiber 121 to be a double-clad fiber. If fiber 121 is not a double-clad fiber, then a tapered fiber bundle would not be used.

The oscillator output 130 is then provided as an input into amplifier 140. As shown in FIG. 2, backward propagation prevention devices 190, i.e., isolator 191 and WDM 192, are coupled into the pathway between the oscillator 120 and the amplifier 140. As discussed above, it is possible to practice aspects of the invention using only one of these components, or with one or more other like components, or some combination thereof.

FIG. 4 is a diagram illustrating amplifier 140 in greater detail. As shown in FIG. 4, the power amplifier stage 140 comprises a respective second fiber segment 141 having an input end 142 and an output end 143. In the present example, the amplifier fiber used to provide second fiber segment 141 is a laser-active, double-clad Yb-doped fiber. A respective second pump source, comprising a plurality of laser diode pumps 144, is coupled to the second optical fiber segment 141 using a second tapered fiber bundle (TFB) 145, or like device. The pump source amplifies the master oscillator laser output 130 to a predetermined power level. The amplifier output 150 is then launched as an input into the CRR stage 160.

FIG. 5 shows a diagram illustrating one type of cascaded Raman resonator 160 in greater detail. Cascaded Raman resonator 160 comprises a third optical fiber segment 161, having an input end 162 and an output end 163. The third optical fiber segment 161 is a suitable Raman-active fiber. As described below, Raman fiber 161 resides within a resonant cavity having an output coupler at its output end. The resonant cavity and the output coupler have wavelength responses that are configured to create a cascaded series of one or more Stoke shifts in a cascaded Raman resonator input so as to increase its wavelength to a selected target wavelength that is provided as an output at the output coupler.

Specifically, Raman fiber 161 has a small effective area and normal (i.e., negative) dispersion. The normal dispersion prevents modulation instability that would lead to super-continuum generation at high power levels. The small effective area is chosen to lead to high Raman gain at the power level provided by amplifier output 150, while avoiding detrimental higher-order nonlinear effects which result from very high optical intensity. Consequently, multiple Stokes orders can be generated in the cascaded Raman resonator, where multiple Raman resonators are made up of multiple fiber-Bragg gratings separated in wavelength by the Raman Stokes shift.

Thus, as shown in FIG. 5, a first series of wavelength-specific high reflector gratings 164 (HR2, HR4, HR6, HR8, HR10) are provided at the input end 162 of Raman fiber 161, and a second series of wavelength-specific high reflector gratings 165 (HR1, HR3, HR5, HR7, HR9) are provided at the output end 163 of Raman fiber 161. In addition, an output coupler (OC) 166 is provided at the output end 163 of Raman fiber 161. In the present example, gratings 164, 165 and 166 are written into separate segments of passive fiber that are fused to Raman fiber 161. It would also be possible to write gratings 164, 165, and 166 directly into the input and output ends of Raman fiber 161.

Input gratings 164, output gratings 165, 166, and Raman fiber 161 provide a nested series of Raman cavities 167. The high reflectors 164, 165 are configured to create a cascaded series of Stokes shifts to raise the wavelength of the amplifier output (and CRR input) 150 to a target wavelength, which is coupled out of the fiber by output coupler 166, and provided as a system output having a selected power level, brightness level, and wavelength. An additional pump reflector (not shown) may be used to recycle unused Yb radiation for increased efficiency.

It will be appreciated that the present invention is not limited to a particular configuration of gratings in the CRR 160, and that the exact wavelengths chosen for the grating will depend upon the selected target wavelength. The FIG. 1 prior art system 20 provides an example of wavelengths for the CRR gratings selected to achieve a target wavelength of 1480 nm. It will also be appreciated that the nested cavities can be created using methods other than Bragg gratings, such as periodic fused-fiber couplers or thin-film reflectors. It will also be appreciated that the CRR could be configured as either a linear cavity or a ring cavity. It will also be appreciated that the CRR can be configured to operate as a laser, or, by leaving off the final set of reflectors and instead by injecting a signal into the CRR at the final wavelength, the CRR can be configured to operate as an amplifier.

As mentioned above, one advantage of the above-described system is that the output power of the oscillator 120 can be kept low enough so that components such as isolator 191 can be inserted between the oscillator 120 and the amplifier 140. Components such as fiber-pigtailed isolators are typically limited to power levels on the order of 10 W to 20 W, which corresponds to the upper limit of output power from the oscillator 120.

Further, other devices, such as wavelength division multiplexer (WDM) 192, can be used to filter out backward-propagating Stokes wavelengths generated in the CRR 160. This is because light at the first Stokes shift can see ionic gain in Yb-doped fibers and consequently destabilize the oscillator. In addition, having a low-power oscillator 120 removes heat load from the sensitive high reflector.

Figure 6:
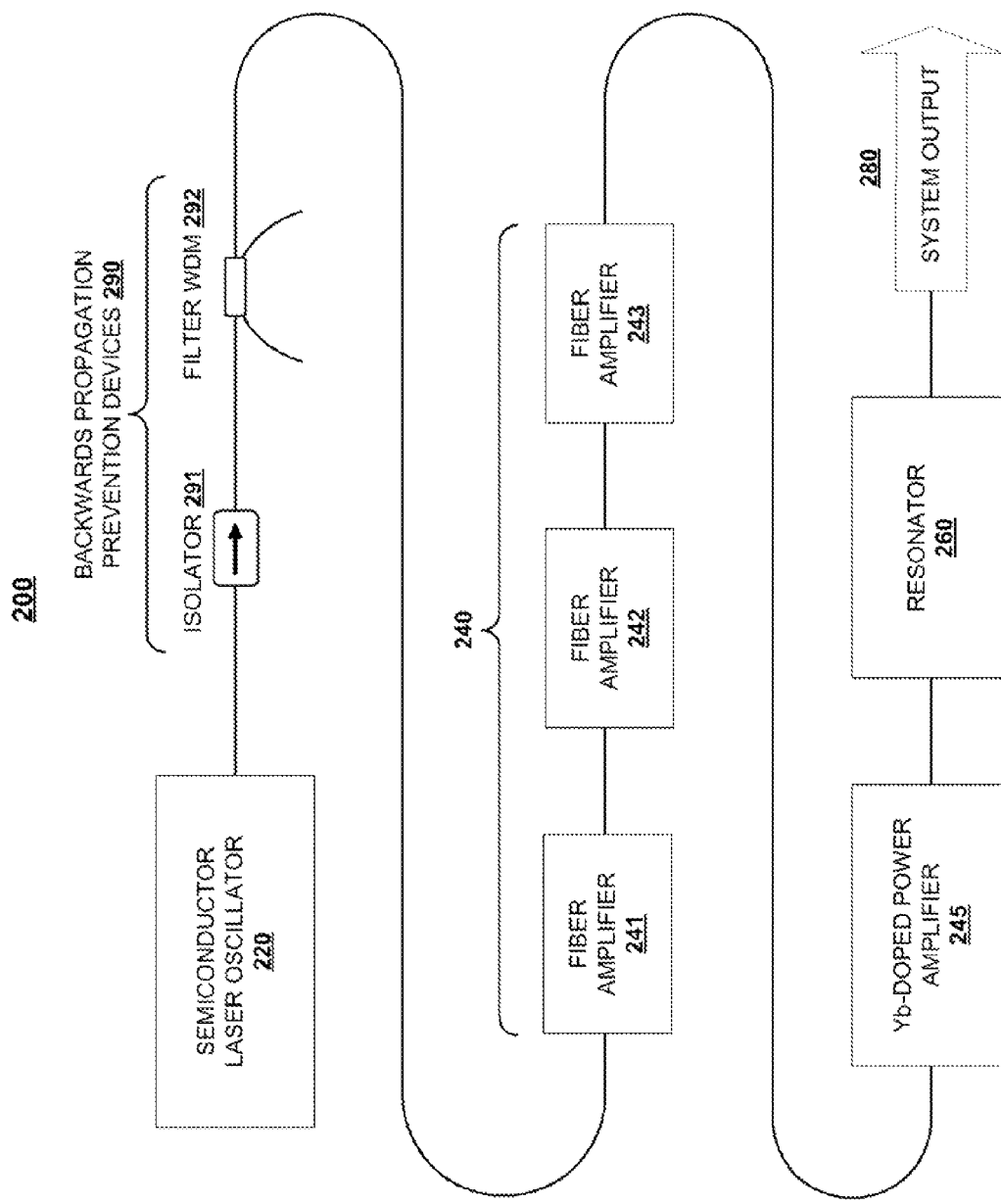
FIG. 6 is a block diagram of a system according to a further aspect of the invention, in which a semiconductor laser oscillator is used.

It will be appreciated that the above-described system 100 can be generalized to use other types of oscillators including, for example, a semiconductor laser. FIG. 6 is a diagram illustrating an exemplary system 200, employing a low-power semiconductor laser oscillator 220, following by a chain of fiber amplifiers 240 which generate the injection into the final Yb-doped power amplifier 245, the output of which is launched into CRR 260. In FIG. 6, amplifier chain 240 is depicted as including three fiber amplifiers 241-243. It will be appreciated that other types and numbers of amplifiers may also be used in practicing aspects of the invention.

The output of CRR 260 is provided as system output 280. As in system 100, a wavelength-dependent loss element, i.e., WDM 292, and an optical isolator 291 are used to isolate the oscillator 220 from the other system components.

Figure 7:
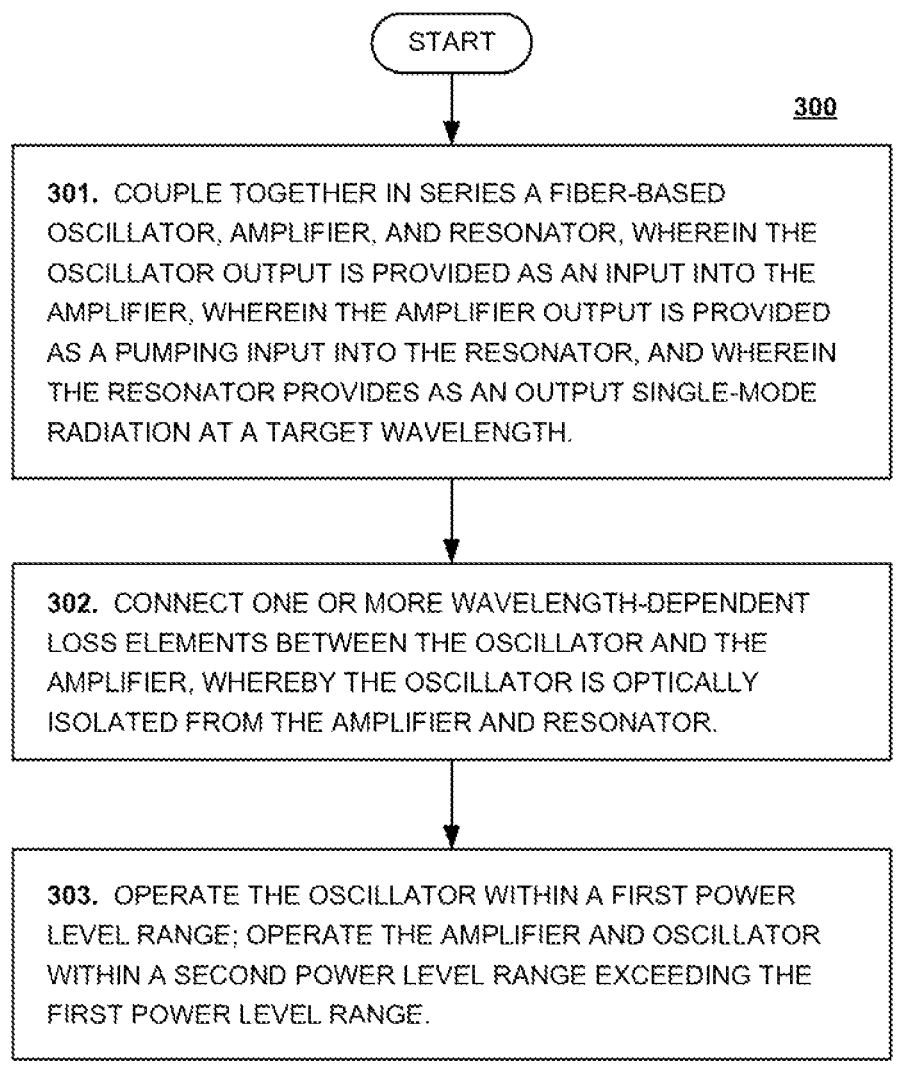
FIG. 7 is a flowchart of a method according to a further aspect of the invention.

FIG. 7 shows a flowchart of a light amplification method 300 according to a further aspect of the invention. Method 300 comprises the following steps:

301: Couple together in series a fiber-based oscillator, amplifier, and cascaded Raman resonator (CRR) wherein the oscillator output is provided as an input into the amplifier, wherein the amplifier output is provided as a pumping input into the CRR, and wherein the CRR provides as an output single-mode radiation at a target wavelength.

302: Connect one or more wavelength-dependent loss elements between the oscillator and amplifier, whereby the oscillator is optically isolated from the amplifier and CRR.

303: Operate the oscillator within a first power level range; operate the amplifier and CRR within a second power level range exceeding the first power level range.

It is noted that the Raman gain bandwidth is quite large and that the reflectors can be positioned anywhere within the gain bandwidth, not necessarily at the peak of the gain.

The above described systems and techniques are applicable in a number of other contexts including, but not limited to: both linear and ring Raman resonators; a Raman amplifier architecture; a double-pump system including a second pump that is non-resonant with any of the Raman cavities, but that is still within the Raman gain bandwidth; hitting a frequency-doubling crystal, for which a polarized output with a narrow linewidth is beneficial; pulsed or modulated operation, as used for example in a parametric system; and the like.

With respect to Raman amplifiers, it is noted that their architectures are typically similar to those of Raman lasers, except that the amplifier Raman cavity is constructed without the last Stokes shift and output coupler. Also, a seed laser is coupled into the Raman cavity at the last Stokes shift. The seed input from the seed source can be injected into the amplifier at different locations. The seed laser controls a number of amplifier properties, such as polarized output, narrow linewidth, tunability, and the like.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A Raman lasing system, comprising:
a pump laser and a cascaded Raman resonator,
wherein the pump laser has a master oscillator power amplifier configuration, comprising
an oscillator for generating an oscillator output, and
an amplifier for receiving the oscillator output as an input and generating therefrom an amplified output at a selected wavelength, and
wherein the cascaded Raman resonator receives the amplified output as an input and generates therefrom an output having a selected target wavelength;
wherein the pump laser further comprises a wavelength-dependent loss element, connected between the oscillator and the amplifier, for preventing damage to the oscillator resulting from backward propagation of light from the amplifier and cascaded Raman resonator into the oscillator,
whereby the power limit requirements for the wavelength-dependent loss element depend upon the power level of the oscillator output, and whereby the system is scalable to have amplifier and cascaded Raman resonator outputs with power levels exceeding the power limits of the wavelength-dependent loss element.

2. The light amplification system of claim 1, further including an optical isolator connected between the oscillator and the amplifier.

3. The light amplification system of claim 1,
wherein, the wavelength-dependent loss element comprises a wavelength division multiplexing filter.

4. The light amplification system of claim 1, wherein the oscillator comprises:
a segment of a laser-active fiber having an input end and an output end,
a high reflector provided at the fiber segment input end and an output coupler provided at the fiber segment output end, wherein the high reflector, output coupler, and fiber provide a laser cavity; and
a pump source coupled to the laser-active fiber for providing a pumping input thereinto.

5. The light amplification system of claim 4, wherein the laser-active fiber is a double-clad fiber.

6. The light amplification system of claim 5, further including a tapered fiber bundle for coupling the pump source to the double-clad, laser-active fiber.

7. The light amplification system of claim 1, wherein the amplifier comprises:
a respective segment of a laser-active, double-clad amplifier fiber having, an input end and an output end, wherein the oscillator output is provided as an input into the input end of the amplifier fiber; and
a respective pump source coupled to the amplifier fiber for amplifying the amplifier input,
wherein the amplifier provides the amplified input as an output at the output end of the amplifier.

8. The light amplification system of claim 7, further including a tapered fiber bundle for coupling the respective pump source to the amplifier fiber.

9. The light amplification system of claim 7, wherein the amplifier fiber is a Yb-doped, double-clad fiber.

10. The light amplification system of claim 1, wherein the cascaded Raman resonator comprises:
a segment of a Raman fiber having an input end and an output end, wherein the amplifier output is provided as a pumping input into the input end of the Raman fiber,
wherein the Raman fiber resides within a resonant cavity having an output coupler at its output end, and
wherein the resonant cavity and the output coupler have wavelength responses that are configured to create a cascaded series of one or more Stoke shills in a cascaded Raman resonator input so as to increase its wavelength to a selected target wavelength that is provided as an output at the output coupler.

11. The light amplification system of claim 10, wherein the resonant cavity comprises a first plurality of high reflectors at the input end of the Raman fiber, and a second plurality of high reflectors and an output coupler at the output end of the Raman fiber.

12. The light amplification system of claim 1, wherein the oscillator comprises a semiconductor laser.

13. The light amplification system of claim 12, wherein the amplifier comprises a plurality of fiber amplifiers and a Yb-doped power amplifier.

14. A Raman lasing method, comprising:
(a) providing a pump laser and a cascaded Raman resonator,
(b) configuring a pump laser to have a master oscillator power amplifier configuration,
   wherein the oscillator is configured to generate an oscillator output having a low power level, and
   wherein the amplifier is configured to receive the oscillator output as an input and to generate therefrom an amplified output at a selected wavelength, and
(c) configuring a cascaded Raman resonator to receive the amplifier output as an input and to generate therefrom an output having a selected target wavelength and power level;
wherein step (a) further includes connecting an isolating element between the oscillator and the amplifier so as to prevent damage to the oscillator resulting from backward propagation of light from the amplifier and cascaded Raman resonator into the oscillator,
whereby the power limit requirements for the isolating element depend upon the power level of the oscillator output, and whereby the system is scalable to have amplifier and cascaded Raman resonator outputs having power levels exceeding the power limits of the isolating element.

15. The light amplification method of claim 14, wherein the step of connecting an isolating element between the amplifier and cascaded Raman resonator comprises:
   connecting an optical isolator between the oscillator and amplifier.

16. The light amplification method of claim 14, wherein the step of connecting an isolating element between the amplifier and cascaded Raman resonator comprises:
   connecting a wavelength division multiplexing filter between the oscillator and amplifier.

17. The light amplification method of claim 14, wherein the oscillator comprises:
   a segment of a laser-active double-clad fiber having an input end and an output end,
   a high reflector provided at the fiber segment input end and an output coupler provided at the fiber segment output end, wherein the high reflector, the output coupler and the fiber provide a laser cavity; and
   a pump source coupled to the fiber for providing a pumping input thereinto.

18. The light amplification method of claim 14, wherein the amplifier comprises:
   a respective segment of a laser-active double-clad fiber having an input end and an output end, wherein the oscillator output is provided as an input into the input end of the amplifier fiber; and
   a respective pump source coupled to the amplifier fiber for amplifying the amplifier input,
   wherein the amplifier provides the amplified input as an output at the output end of the amplifier.

19. The light amplification method of claim 18, wherein the respective pump source is coupled to the amplifier by means of a tapered fiber bundle.

20. The light amplification method of claim 14, wherein the cascaded Raman resonator comprises:
   a segment of a Raman fiber having an input end and an output end, wherein the amplifier output is provided as a pumping input into the input end of the Raman fiber segment,
   wherein a first plurality of high reflectors are provided at the input end of the Raman fiber segment, and a second plurality of high reflectors and an output coupler are provided at the output end of the Raman fiber segment,
   wherein the high reflectors and the output coupler have wavelength responses that are configured to create a cascaded series of one or more Stoke shifts in the cascaded Raman resonator input so as to increase its wavelength to a selected target wavelength that is provided as an output at the output coupler.

21. The light amplification method of claim 20, wherein the amplifier comprises a plurality of fiber amplifiers and a Yb-doped power amplifier.

* * * * *